*Cavnah & Yeagley,*

*Pump.*

No. 97,274. Patented Nov. 30, 1869.

Witnesses:
Jno. D. Patter
Edmund Masson

Inventors:
Edw'd S Cavnah
David Yeagley
by A. B. Stoughton
attorney

United States Patent Office.

EDWARD S. CAVNAH AND DAVID YEAGLEY, OF BOURBON, INDIANA.

Letters Patent No. 97,274, dated November 30, 1869.

IMPROVEMENT IN PUMPS.

The Schedule referred to in these Letters Patent and making part of the same.

*To all whom it may concern:*

Be it known that we, EDWARD S. CAVNAH and DAVID YEAGLEY, of Bourbon, in the county of Marshall, and State of Indiana, have invented certain new and useful Improvements in Pumps; and we do hereby declare the following to be a full, clear, and exact description of the same, reference being had to the accompanying drawings, making a part of this specification, in which—

Figure 1:
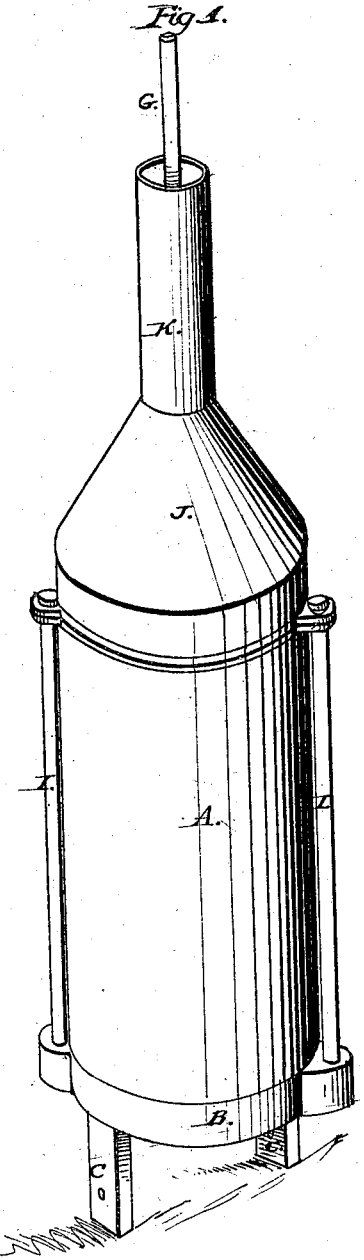
Figure 1 represents a perspective view of the exterior of the pump.
Figure 2:
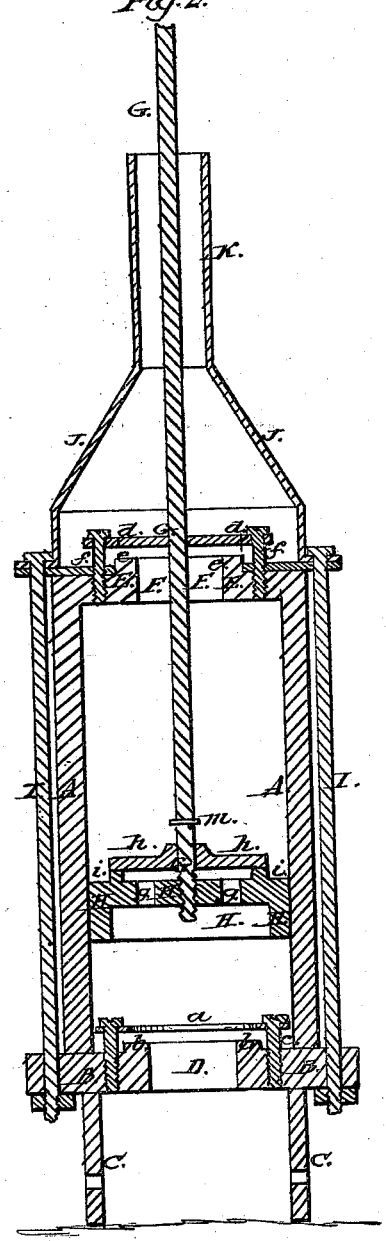
Figure 2 represents a vertical section through the same.

Our invention relates to an arrangement of circular or disk-valves, that have but a slight rising and falling motion, which, not requiring packing, are very durable and reliable; these valves being so arranged in connection with pump-cylinder and valve or pump-rod, as to raise the water by lifting, and not by suction, and, as above stated, by a very slight motion of the valves from their seats.

To enable others skilled in the art to make and use our invention, we will proceed to describe the same in reference to the drawings.

A represents a cast-iron cylinder, which is supported on a bottom or base-plate, B, that is in turn supported in the well, and near the bottom of the well, on legs or stands $c$.

Through the bottom or base B there is a water-way, D, which is covered on the inside of the cylinder by a flat circular plate-valve, $a$, which has its seat at $b$, and is controlled in the extent of its upward movement by the guides $c$ $c$. The valve $a$ rises and falls in a horizontal plane, and is neither hinged nor packed, and there is, consequently, nothing to wear out.

Through the top E of the cylinder there is a water-way, F, commanded by a valve, $d$, formed and operated like that, $a$, above described, its seat being at $e$, and its guides shown at $f$.

The valve or pump-rod G passes through the upper valve $d$, and has upon its lower end a ring-head, H, through which there are water-ways, $g$ $g$, of any suitable number, and on top of which there is an annular flange, $i$, that forms a seat for the circular valve $h$, which has also a horizontally rising-and-falling motion, equal to the distance from the flange-seat $i$ to a stop or collar, $m$, on the pump-rod G, the stem of the pump-rod being the guide to the valve $h$. Both the valve $d$ and the valve $h$, are without hinges or packing, and the extent of their motions so slight that there is no slamming or wearing by their action.

On top of the cylinder is secured, by the screw-rods I I, or otherwise, a conical piece, J, which finally unites with the water-pipe or stock K, through which the water is raised, the pump-rod G passing through said tube, pipe, or stock, and extending down to near the bottom of the cylinder A. The valves and the water-ways or passages are in a direct line from the bottom of the cylinder to near the top of the pipe, tube, or stock, from which point it may deflect from the direct line.

Having thus fully described our invention,

What we claim therein as new, and desire to secure by Letters Patent, is—

In combination with the cylinder A, and pipe, tube, stock, or water-passage extending upward therefrom, the openings D F in the heads of the cylinder, and the openings $g$ in the plunger, when said openings are controlled by the circular valves $a$ $d$ $h$, operating in the manner and for the purpose described and represented.

EDWARD S. CAVNAH.
DAVID YEAGLEY.

Witnesses:
JOSEPH A. CAVNAH,
WILLIAM S. McCROM.